(12) United States Patent
Eichenmiller et al.

(10) Patent No.: US 6,231,639 B1
(45) Date of Patent: May 15, 2001

(54) MODULAR FILTER FOR MOLTEN METAL

(75) Inventors: David J. Eichenmiller, Chesterland;
Richard S. Henderson, Solon;
Lennard D. Lutes, Akron, all of OH
(US); Harvey Martin, B'ham, AL (US)

(73) Assignee: Metaullics Systems Co., L.P., Solon, OH (US)

( * ) Notice: Subject to any disclaimer, the term of this patent is extended or adjusted under 35 U.S.C. 154(b) by 0 days.

(21) Appl. No.: 08/813,256

(22) Filed: Mar. 7, 1997

(51) Int. Cl.⁷ .................................................. C22B 9/02
(52) U.S. Cl. ............................ 75/407; 75/412; 266/227; 266/236; 210/232; 210/323.2; 210/455; 210/510.1; 210/496; 210/497.01
(58) Field of Search ............................ 210/450, 496, 210/455, 497.01, 510.1, 767, 232, 323.2; 75/412, 407; 266/227, 236; 164/358

(56) References Cited

U.S. PATENT DOCUMENTS

| | | |
|---|---|---|
| 3,747,765 | 7/1973 | Nowak . |
| 4,024,056 * | 5/1977 | Yarwood et al. ............ 210/455 |
| 4,081,371 * | 3/1978 | Yarwood et al. ............ 210/455 |
| 4,401,295 | 8/1983 | Yoshida . |
| 4,964,993 | 10/1990 | Stankiewicz . |
| 5,126,047 | 6/1992 | Martin et al. ............ 210/450 |

FOREIGN PATENT DOCUMENTS

| | | |
|---|---|---|
| 1 294 742 | 3/1970 | (GB) . |
| 0407831 | 3/1992 | (JP) . |
| 04311538 | 11/1992 | (JP) . |

* cited by examiner

Primary Examiner—Robert Popovics
(74) Attorney, Agent, or Firm—Fay, Sharpe, Fagan, Minnich & McKee, LLP

(57) ABSTRACT

A filter cartridge for a molten metal filtering system is provided with a modular construction in which the filter elements are adapted to be removably mounted to an end plate. The filter elements may be removed separately from the filter and replaced with new filter elements without removing the entire cartridge assembly. According to another aspect of the invention, the filter elements are provided with an elliptical cross-section.

10 Claims, 6 Drawing Sheets

MODULAR FILTER FOR MOLTEN METAL

BACKGROUND OF THE INVENTION

The invention relates generally to the field of molten metal casting and to the field of filtration. Specifically, the invention relates to a filtering device for molten metal.

Wrought aluminum castings are used to produce high-grade stock for use in cans, as foil, litho sheets, memory disc substrates and aircraft components, for example. The casting process typically involves providing metal in a molten state using a furnace. The molten metal is then ultimately delivered to a casting mold or a secondary receiver for holding the molten metal at an elevated temperature for later casting.

It is desirable to remove any impurities or inclusions that may have been introduced into the molten metal at some stage during the casting process. Although sedimentation and flotation methods, which capitalize on the density differences between the molten metal and impurities, have been used, it is well recognized that filtration techniques are much more efficient than those methods.

Molten metal filtration is usually accomplished using filter elements formed of a porous refractory material. The molten metal is directed through the filter elements such that impurities are removed. Typically, inclusions that are above 5 microns in dimension are filtered from the molten metal in high-grade applications. Filtration can be performed by flowing molten metal through a filter box, which houses a filter assembly in such a way that the assembly may be removed and replaced as it becomes contaminated with the removed impurities. Similarly, in a trough filtration system, a plate filter is positioned as a type of trap in the trough. Molten metal, therefore, passes through the plate as gravity flows it through the trough.

Much attention has been given to the design of filter assemblies used in casting processes. It is desirable to minimize the footprint "floor space," and volume occupied by the filter assembly in order to provide sufficient casting space. On the other hand, it is desirable to maximize the filter surface area in order to minimize the velocity of molten metal through the filter itself. An optimized design must balance the factors of footprint, total flow and velocity through the filter. Because filters must be periodically replaced, their cost is a significant factor that affects the feasibility of using a particular filter construction. Of equal importance is the down-time of a casting line required when a filter must be replaced. Obviously, productivity can be increased by decreasing filter change time. There have thus been efforts to provide relatively low-cost filtering devices which achieve a requisite throughput while occupying as little space as possible.

It is known to provide a filter assembly in the form of a cartridge filter unit that is constructed of a plurality of tubular filter elements adhesively bonded between end plates. Such a cartridge is described in U.S. Pat. No. 5,126,047, the subject matter of which is incorporated herein by reference. The cartridge comprises a plurality of generally horizontally oriented cylindrical tubes that are connected at their ends to a pair of spaced, generally parallel, ceramic refractory end plates. One end plate is provided with holes that are in fluid communication with the hollow interiors of the tubes. The other end plate abuts the closed ends of the tubes. In use, the filter cartridge is disposed within a filter box into which molten metal flows. The molten metal is filtered as it travels from the exterior of the tubes to the interior of the tubes. The filtered molten metal then flows through the tube interior and through the holes in the end plate to the outlet of the filter box. An advantage of a cartridge filter over a plate filter is that a cartridge filter provides a greater surface area within the same size footprint as a two-dimensional plate filter.

While such a filter cartridge construction offers superior filtration capabilities as compared to other filter constructions, its high cost may make it uneconomical. One of the primary reasons for the high cost associated with such prior art filter cartridges relate to their unitary construction. Specifically, the filter cartridge must be replaced as a single unit because filter elements are permanently bonded to the end plates using a refractory cement.

More importantly, this construction also results in considerable down-time during filter changes, since the entire cartridge must be preheated before use, typically requiring up to 24 hours for a cartridge with a large number of filter tubes. Another disadvantage is that the filter cartridge is generally a bulky structure which is difficult to lift and which must be carefully installed, often requiring significant manpower. To this end, holes are usually provided in the end plate to permit lifting equipment to attach to the end plate.

SUMMARY OF THE INVENTION

The present invention solves the aforementioned and other problems in the prior art by providing a modular construction for a filter cartridge in which the filter elements are adapted to be removably mounted to an end plate which is provided in the filter box or trough. The term "modular" as used herein refers to the capability for the separate interchange of parts that comprise an assembly. The term "removably mounted" refers to the ability of one component to be connected to or engaged with another such that the components can be later separated while remaining intact thereafter. According to one aspect of the invention, the filter elements are adapted to be removably mounted to the end plate, which may itself be removably mounted within the filter well. According to an alternative aspect of the invention, the filter elements are formed as tubular elements having an elliptical cross-section as opposed to a circular cross-section.

The modular construction of the filter cartridge according to the present invention provides the advantage of reducing the overall cost of using the filter cartridge since the end plate need not be replaced each time the filter is replaced. This construction also provides the advantage of reducing pre-heating times, since the filter elements may be pre-heated separately and outside of the filter box before filter replacement occurs. Filter replacement is simple since the individual filter elements may be handled, removed, and installed separately. Because the end plate may remain in the filter box while the filter elements are removed, the production delay associated with pre-heating the end plate is eliminated. Furthermore, since each tube is individually seated and sealed, the complex task of assuring simultaneous seating of several tubes on the large surface area of an end plate is avoided. Similarly, it will be recognized that a tool or structural design of the base of the filter box can enable the proper register of multiple tube.

The elliptical construction of filter elements according to the present invention provides improved priming characteristics associated with the filter well because the elliptical construction provides more area in a given horizontal plane, thereby reducing the pressure differential in the vertical direction within the filter element. This results in increased flow through the filter element at a given elevation within the filter well as compared to a filter element having a circular cross-section.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, wherein.

DETAILED DESCRIPTION OF THE PREFERRED EMBODIMENTS

Figure 1:
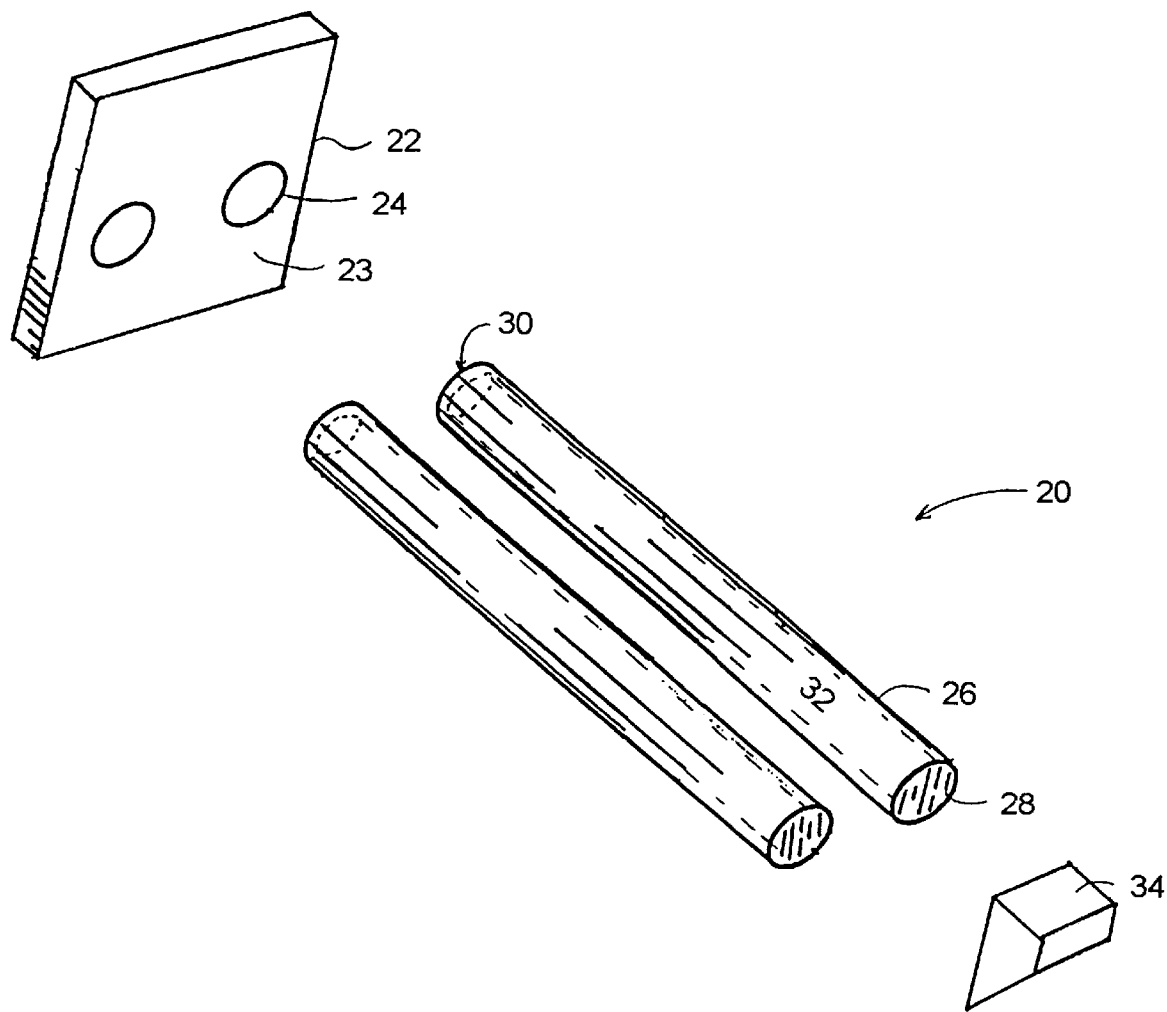
FIG. 1 is an isometric of a filter kit according to a preferred embodiment of the invention.

Referring now to the drawings wherein the showings are for the purposes of illustrating the preferred embodiment of the invention only and not for purposes of limiting same, the FIGURES show a filter element, filter kit and filter box in accordance with the present invention.

Figure 2:
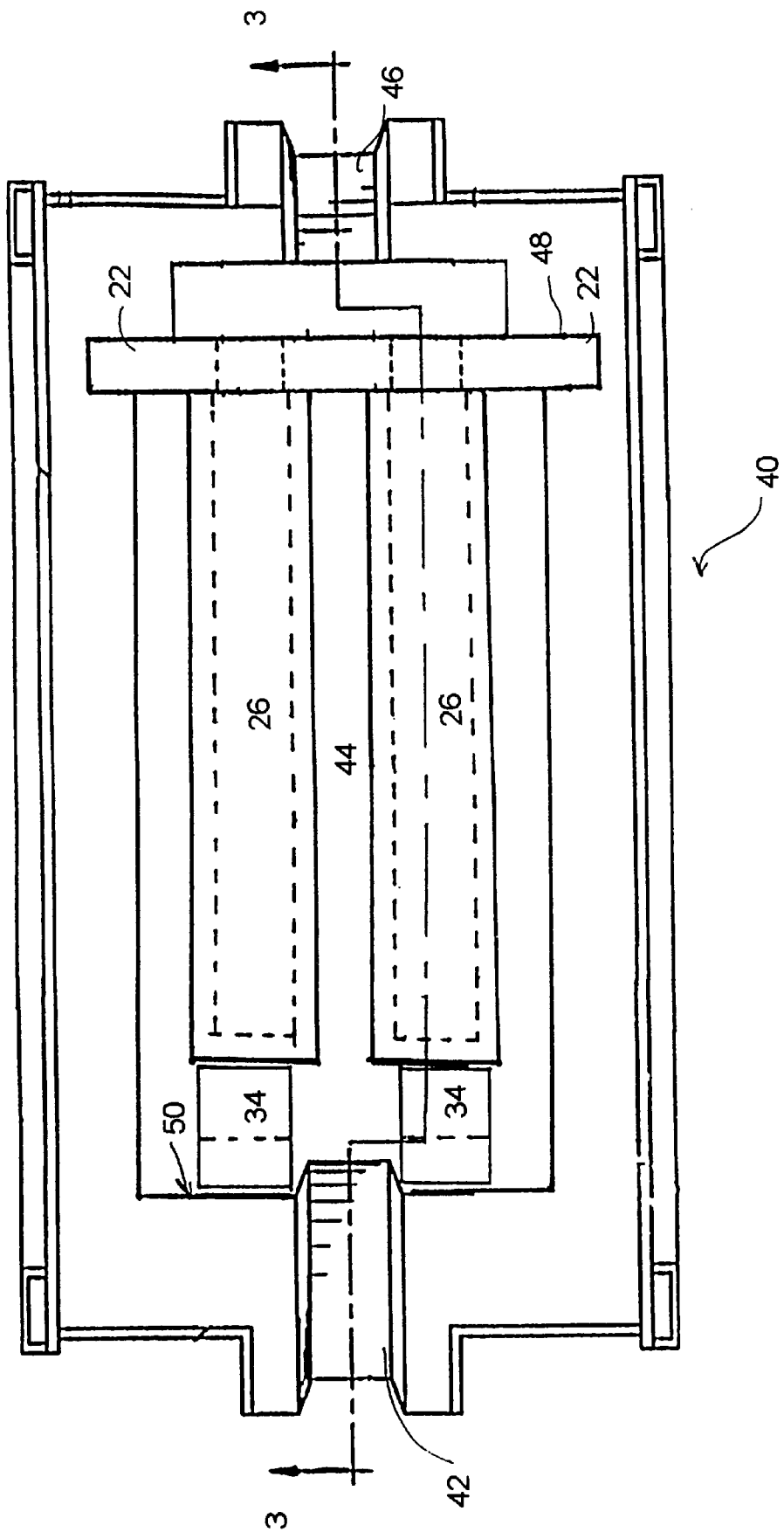
FIG. 2 is a top view of a filter well according to the present invention.

FIG. 1 illustrates a filter kit 20 according to the present invention. It comprises an end plate 22 which may be constructed of a molten-aluminum resistant refractory material. End plate 22 is adapted to be mounted in a filter well and is provided with a number of openings 24 (two are illustrated) for conveying filtered molten metal to an outlet of a filter well, as will be described below. Two filter elements 26 are provided for removable engagement with the end plate 22. While one row of two elements is described here, it will be recognized that more than a single tube row may be provided, i.e., two rows of two elements, two rows of four elements, etc. Each filter element 26 is provided as a hollow tubular element of particulate refractory material and having a closed end 28 and an open end 30 and an inner cavity 32 communicating therewith. In accordance with the invention, filter elements 26 are adapted to be removably mounted to end plate 22. For example, as illustrated in FIG. 2, the open end 30 of each filter element 26 is provided with a flat surface for abutting engagement with the face of the end plate in the area immediately surrounding an associated opening 24. To retain the removable filter elements in place, a wedge block 34 is provided for each filter element 26 (only one wedge block is shown) and cooperates therewith in a manner that will be described.

Figure 1A:
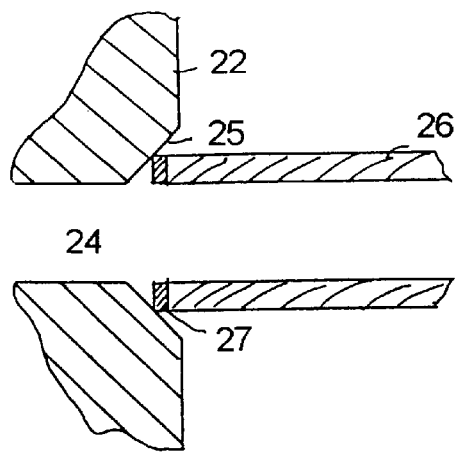
FIGS. 1A–1C illustrate preferred mounting configurations for a filter element according to the present invention.
Figure 1B:
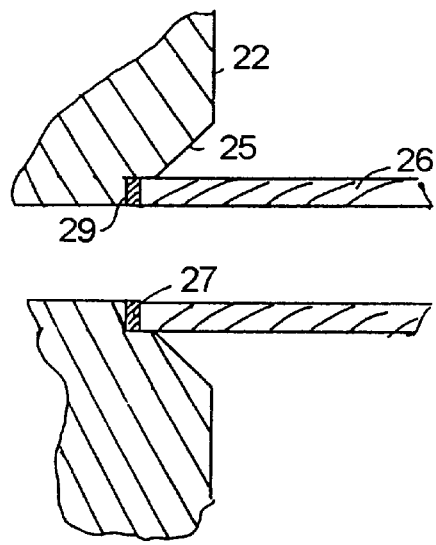
Figure 1C:
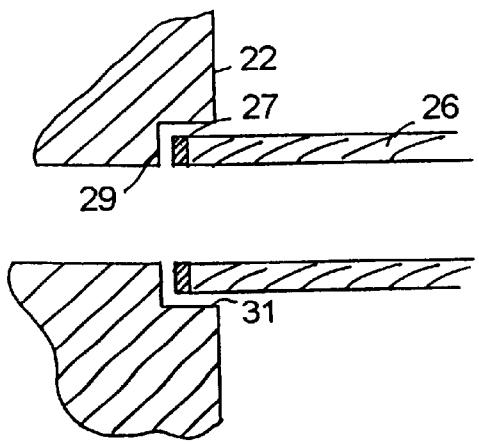

FIG. 1A illustrates a preferred construction for the mounting details of a filter element 26 according to the present invention. End plate 22 is provided with a tapered inlet opening 25 around an opening 24 in the end plate 22. A gasket 27 is provided on the tube end for providing sealing engagement with the tapered face 25. FIG. 1B illustrates a second preferred construction for the mounting configuration according to the present invention. Like the embodiment in FIG. 1A, the embodiment of FIG. 1B is provided with a tapered face 25 on the end plate 22. The tapered face 25 provides a larger opening into which the filter element 26 may be initially introduced for providing ease of alignment of the filter element with the end plate. In the embodiment of FIG. 1B, the end plate is provided with a shoulder 29 for abutting one face of gasket 27, the opposite face of gasket 27 engaging the end of filter element 26. FIG. 1C shows another preferred construction of the mounting details. In this embodiment, no tapered face is provided on the end plate 22. However, a shoulder 29 is provided for abutting engagement with the gasket 27. In the embodiment in FIG. 1C, a gap is shown between the outer circumference of the filter element 26 and the recess 31 formed in the end plate 22 for receiving the end of the filter element. While the gap is illustrated at FIG. 1C, it is in exaggerated form as the clearances between the recess 31 and the outer circumference of filter element 26 will be only large enough so that installation of the filter element 26 into engagement with the end plate 22 may be easily facilitated.

Figure 3:
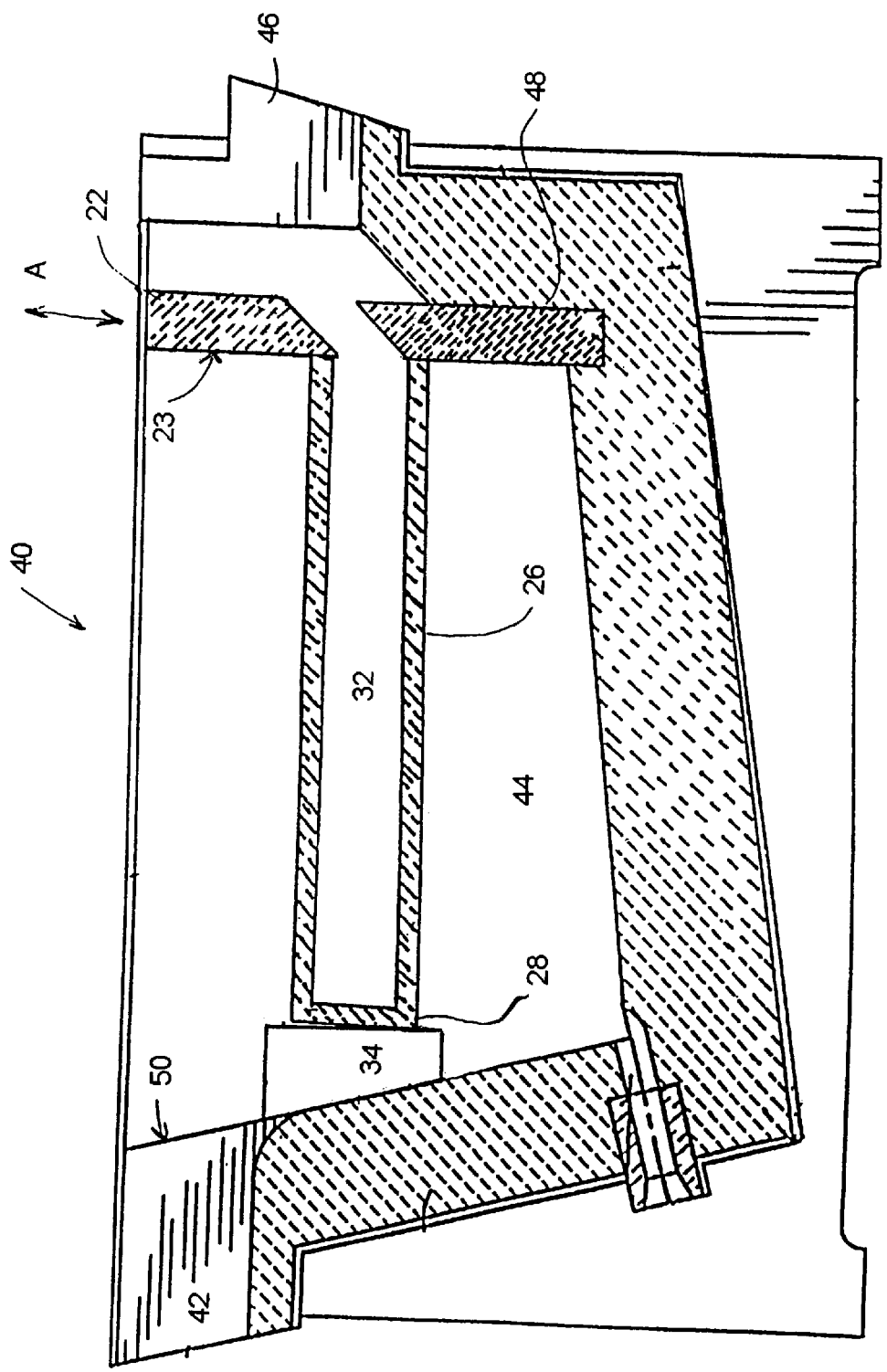
FIG. 3 is a cross-sectional view taken along lines 3—3 of FIG. 2.

FIGS. 2 and 3 represent a top and a side cross-sectional view of a filter box, generally referenced 40, which is adapted according to the present invention. Filter box 40 generally comprises an inlet 42 for conveying molten metal to a filter well 44 and an outlet 46 for conveying filtered molten metal from the filter well 44. End plate 22 is, at its sides, disposed in complementarily shaped recesses or slots 48 which permit the end plate 22 to be slid into and out of engagement with the filter well in the direction of arrow A in FIG. 3.

According to the present invention, filter elements 26 are retained in abutting engagement with the face 23 of end plate 22 by wedge blocks 34, which are constructed of a refractory material. The interior cavity 32 of the filter elements are in fluid communication with the openings 24 in end plate 22 such that filtered molten metal may be conveyed to outlet 46. Wedge blocks 34 engage the closed end 28 of filter elements 26 as well as the filter wall 50 to provide a lateral force on the filter elements which retains them in abutting engagement with the end plate 22. It will be recognized that filter elements 26 may be removed separately from engagement with the end plate 22 by first removing an associated wedge block 34 and then lifting the filter element 26 from the filter well. It will further be recognized that the force provided by wedge blocks 34 may be adjusted to provide a fluid tight connection between filter elements 26 and end plate 22.

Figure 4C:
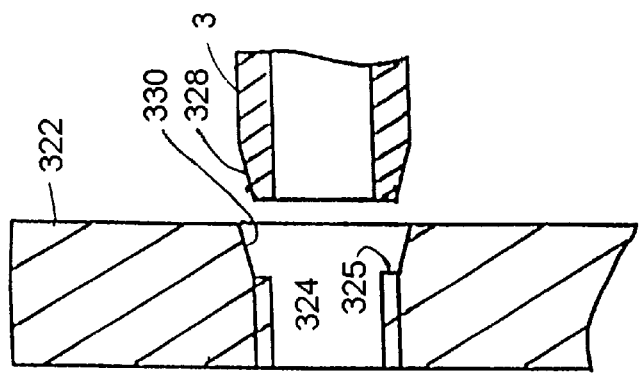
FIGS. 4A–4D represent alternative mounting configurations for a filter element according to the invention.

The configuration illustrated in FIGS. 1–3 is one preferred technique for adapting the filter elements to be removably mounted to the end plates. Other techniques have been contemplated as shown in the cross-sections of FIGS. 4A–4C which depict a single filter element/end plate connection. Specifically, FIG. 4A illustrates an end plate 122 which is provided with an enlarged opening 124 for receiving the outer diameter of filter element 126. A shoulder 125 is provided for abutting the end 130 of the filter element 126. A tubular projection 127 is provided for engaging the outer diameter of filter element 26 to provide additional support and sealing capability thereto.

Figure 4B:
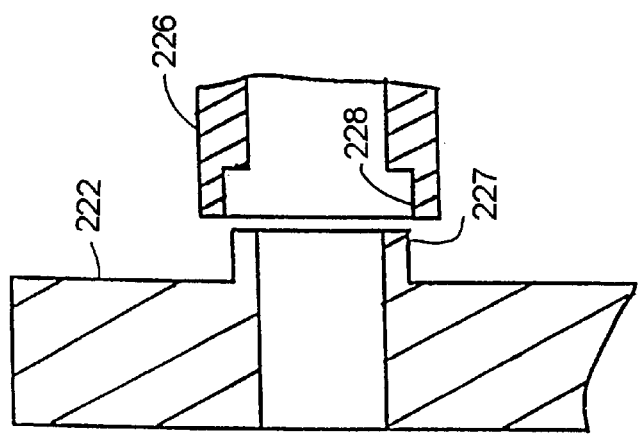
Figure 4A:
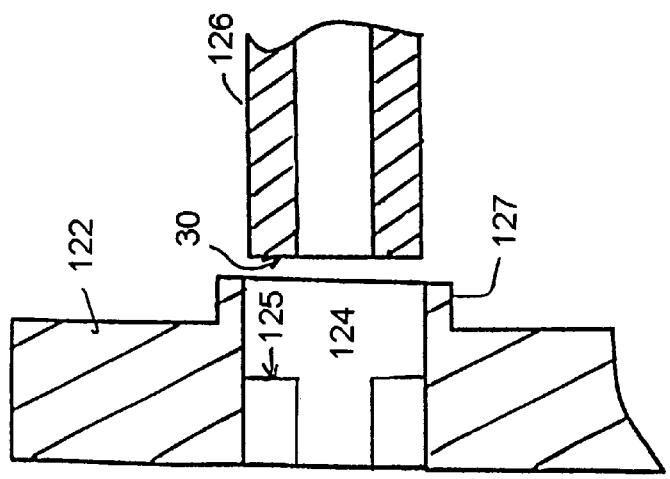
Figure 4D:
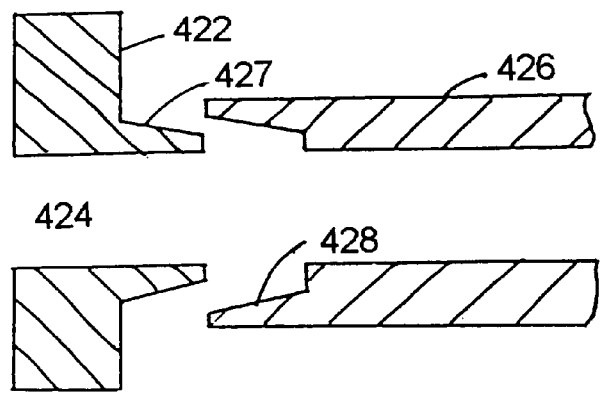
Figure 5:
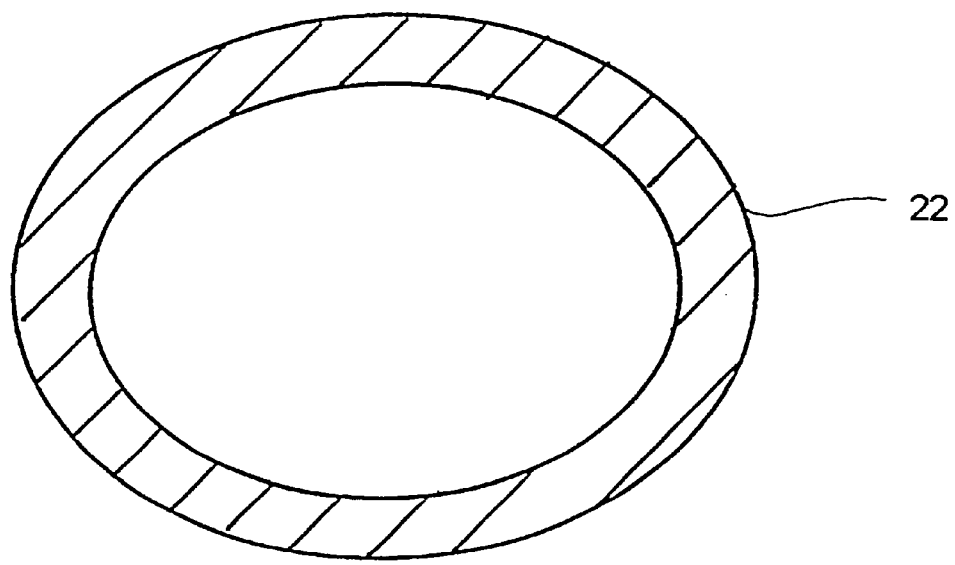
FIG. 5 is a cross-sectional view of an alternative filter element according to the present invention.

FIG. 4B illustrates another embodiment of the present invention in which the filter element 226 is adapted to be removably mounted to the end plate 222 by incorporating an inner recess 228 which receives a tubular projection 227. FIG. 4C illustrates another embodiment in which the filter element 326 is provided with a taper 328 which is received in a complementarily shaped tapered recess 330 on end plate 322 which also includes a shoulder 325 on the interior of opening 324. FIG. 4D illustrates a filter element 426 that is provided with an internal taper 428 which sealingly engages a tapered projection 427 on end plate 422. While FIGS. 1–3 depict filter elements 22 which are of a generally circular cross-section, it will be appreciated that the inventive principles demonstrated thereby are applicable to other filter element configurations.

In accordance with another aspect of the invention, the filter elements 22 may be provided with a generally elliptical cross section as shown in FIG. 6. The elliptical cross-section provides an advantage related to the priming of the filter element. An elliptical cross-section provides a larger horizontal surface area as compared to a circular tube of the same outer surface area. As molten metal is introduced into the box, a head pressure is required for priming of the filter element. In turn, the smaller vertical cross-sectional height of the elliptical tube may allow complete priming of all elevations of the tube at a lower overall fill depth of the filter box.

The invention has been described with reference to the preferred embodiments. Obviously, modifications and alterations will occur to others upon a reading and understanding of this specification without departing from the spirit and scope of the invention described herein. The invention is intended to include all such modifications and alterations insofar as they come within the scope of the appended claims or the equivalents thereof.

What is claimed is:

1. A modular filter for filtering molten metal comprising:

an end plate adapted to be mounted in a filter well and including a plurality of apertures for accommodating a flow of filtered molten metal therethrough;

a corresponding plurality of filter elements for removing impurities from molten metal, the filter elements being formed from a particulate refractory material and including an inner cavity, an open end and an opposite open or closed end, each of the filter elements adapted to be removably mounted to the end plate and individually installed or removed from the filter well without disturbing the filter elements not being removed or installed;

said end plate further including a plurality of recesses or protrusions which register said open end of said filter elements;

whereby each of the plurality of filter elements can be individually installed or removed from the filter well while the end plate remains mounted in the filter well.

2. The filter kit according to claim 1, wherein the filter element is of an elliptical cross-section.

3. The filter kit according to claim 1, further comprising a wedge block for engaging a wall of the filter well the opposite end of the filter element to force the filter element toward the end plate.

4. The filter kit according to claim 1, further comprising a gasket for sealing between the filter element and the end plate.

5. The filter kit according to claim 1, wherein the open end of the filter element is tapered.

6. A filter box for filtering molten metal comprising:

a well formed within the filter box;

an inlet for conveying molten metal to the filter well;

an outlet for conveying molten metal from the filter well;

an end plate mounted in the well and including at least one aperture for communicating a flow of filtered molten metal to the outlet;

a set of elongated filter elements for removing impurities from molten metal, each of the filter elements including an inner cavity, an open end and an opposite end, the filter elements adapted to be removably mounted to the end plate such that their inner cavity communicates with the aperture;

a wedge block engaging the opposite end of each of the filter elements and urging their open end against the end plate, the wedge block being selectively removable to allow installation or removal of individual filter elements without disturbing the other filter elements not being installed or removed;

whereby each of the filter elements can be removed from engagement with the end plate while the end plate remains in the filter well.

7. The filter box according to claim 6, wherein the filter element is a generally tubular body comprised of a particulate material.

8. The filter box according to claim 7, wherein the filter element is of an elliptical cross-section.

9. The filter box according to claim 6, wherein the end plate is provided with a recess for accommodating the open end of the filter.

10. A method of using a modular filter kit for filtering molten metal, the kit comprising an end plate adapted to be mounted in a filter well and including an aperture for accommodating a flow of filtered molten metal therethrough; at least first and second filter elements for removing impurities from molten metal, the filter elements being formed from a particulate refractory material and including an inner cavity, an open end and an opposite end, each of the filter elements adapted to be removably mounted to the end plate and individually installed or removed from the filter well, the method comprising the steps of:

(a) inserting the end plate into a filter well;

(b) inserting the first filter element into the filter well in engagement with the end plate and positioning a wedge block into communication with the opposite end of the first filter element thereby urging the open end of the first filter element against the end plate;

(c) operating the filter well;

(d) removing the first filter element from the filter well while maintaining said end plate in the filter well and without disturbing any of the filter elements still remaining within the filter well; and (e) replacing the first removed filter element with the second filter element.

* * * * *